United States Patent
Gutzmann et al.

[11] Patent Number: 6,118,861
[45] Date of Patent: Sep. 12, 2000

[54] CALLING PARTY INVOKED HELD CALL MONITORING

[75] Inventors: Douglas B. Gutzmann; Fred J. McConnell, both of Calgary; Duncan R. H. McLaren, Brockville, all of Canada

[73] Assignee: Nortel Networks Corporation, Montreal, Canada

[21] Appl. No.: 08/916,979

[22] Filed: Aug. 14, 1997

[51] Int. Cl.[7] .................................................. H04M 3/42
[52] U.S. Cl. ..................... 379/201; 379/207; 379/209; 379/215
[58] Field of Search ................................... 379/201, 207, 379/265, 266, 309, 209, 215, 210, 211, 212, 219, 88.11, 88.16, 88.18, 88.22

[56] References Cited

U.S. PATENT DOCUMENTS

| | | | |
|---|---|---|---|
| 4,425,479 | 1/1984 | Dubner et al. .............................. | 379/87 |
| 4,731,822 | 3/1988 | Berry, III et al. ...................... | 379/204 |
| 5,432,846 | 7/1995 | Norio ....................................... | 379/266 |
| 5,436,957 | 7/1995 | McConnell ............................... | 379/201 |
| 5,436,967 | 7/1995 | Hanson ................................... | 379/266 |
| 5,692,033 | 11/1997 | Farris ...................................... | 379/209 |
| 5,764,746 | 6/1998 | Reichelt .................................. | 379/207 |
| 5,873,068 | 2/1999 | Beaumont et al. .................. | 379/93.12 |
| 5,970,134 | 10/1999 | Highland et al. ...................... | 379/265 |

*Primary Examiner*—Harry S. Hong
*Assistant Examiner*—Benny Q. Tieu
*Attorney, Agent, or Firm*—Cobrin & Gittes

[57] ABSTRACT

There is described a held party notification monitoring feature which is activated or invoked by a calling party when placed on hold. The monitoring feature is invoked to monitor a communication link established between a first party and a second party wherein the first party has placed the second party on hold. In response to the second party being placed on hold by the first party, a request is generated at the second party to monitor the communication link for a signal indicative of the termination of the hold.

Responding to the receipt of the generated request to monitor the communication link for the termination of the hold, a message is generated to the first party indicative that a held call monitoring feature has been activated and awaits the first party to generate the signal indicative of the termination of the hold. In response to the signal being generated by the first party, the second party is alerted of the termination of the hold.

24 Claims, 4 Drawing Sheets

CALLING PARTY INVOKED HELD CALL MONITORING

FIELD OF THE INVENTION

This invention relates to held party notification but more particularly, this invention relates to a held party notification monitoring feature which is activated or invoked by the calling party when placed on hold. The invention further relates to an apparatus and method for activating a monitoring feature to enable the calling party to be alerted if the hold condition has been removed by the called party.

BACKGROUND OF THE INVENTION

One of the key frustrations of being placed on hold is not knowing how long it will take before the hold is released. It is not uncommon in certain scenarios for a caller to be put on hold for ten minutes or longer.

For example, market research has indicated that 35% of health care clinics indicated that their staff spent over six hours per week waiting for calls to be taken off hold by other physicians' practices, insurance companies, or other health care players.

Although held call monitoring has been proposed in the past, the features are activated and invoked when desired at the called party's end without much control on the part of the calling party.

For example, U.S. Pat. No. 5,436,967, which issued to Hanson, discloses a held party call-back arrangement. The intent of this invention is to provide a busy agent at a call centre with the ability to return the calling party's call to mitigate the frustration of being put on hold. In this regard, the call centre provides the calling party with the option of being called back by the call centre when the agent is free. This is done either by automatically capturing the calling line ID (CLID) of the calling party or by asking the calling party to leave a voice message with a telephone number where he or she can be reached. Although the intent of the invention is to make call centres as caller friendly as possible, providing callers in queue with the option of being called back rather than waiting on hold, the invention relies on the called party having a call center with a call return feature to return incoming calls.

The invention applies well to businesses who have a need to be very caller satisfaction oriented, such as, for example order desks, customer service centers, etc. where inbound callers are generating revenue. However, many call centres are service bureaus, help desks, etc. where the emphasis is on cost minimization, i.e. reducing agent time per call, etc. rather than providing satisfaction to their caller and would therefore not be likely to install a call centre with this feature.

In addition, many callers would not be satisfied with either option: i.e. waiting on hold is frustrating and wastes time; and leaving a message to be called back is uncertain, that is, what assurance does the caller have that his position in the queue is maintained or that he will be called back. In some situations, this is impractical, especially when the caller is calling from a payphone or another number he cannot be reached at.

U.S. Pat. No. 4,731,822, which issued to Berry, III et al., is directed to a held party notification feature for use on a system such as a PBX wherein both the calling party and the called party are using extension telephones of this PBX. With this invention, when the called party places the calling party on hold, the held party is required to leave the receiver off-hook. A call processor software monitors the station set of the called party to detect the removal of the hold condition and of the calling party to detect on or off hook conditions. In response to the detection of the removal of the hold condition, such as when the called party depresses the line button on his or her telephone set, a signal such as a short burst of ringing is applied to the held party's station set to indicate that the call is no longer on hold. The conversation can then resume as soon as the held party retrieves the receiver. The problem with the aforementioned invention is that it does not address the scenario of a caller attempting to reach a called party over the public network who may be located at a different location. In addition, since the invention uses internal proprietary PBX signalling to determine the state and button presses of each extension, this feature is applicable uniquely to the manufacturer's PBX. Thus when a call is taken off hold, the PBX receives the appropriate signalling and signals the other party that a call has now been continued. When calls are made outside the bounds of the specific calling centre or switching system, this signalling and status information is not available and the feature does not apply.

U.S. Pat. No. 4,425,479 which issued to Dubner et al. describes an apparatus for enunciating completion of the hold. The invention describes a hardware peripheral device that is installed at the caller's telephone. When the calling party is placed on hold by the called party, the calling party places the handset onto the peripheral device and the peripheral device then monitors the audio signal coming from the holding party using voice detection circuitry. When a voice is detected, the peripheral device plays tones over the speaker that alerts the calling party to pick up the handset and resume conversation. This invention has a number of limitations, for example: it requires a hardware peripheral device to be available at the held person's telephone. It will not work when the holding party plays music or messages on hold or there is noise on the line, as these situations would be interpreted as a call answer; the caller cannot use their telephone while the call is being monitored; the alert tones would be confusing; and the called party would likely hang up if the caller does not pick up the phone immediately.

Accordingly, a need exists for a held line monitoring feature which overcomes the problems associated with the prior art.

Accordingly, it is a first object of the present invention to provide a method of enabling a subscriber invoked held call monitoring feature to subscribers that have established a communication link between each other.

Another object of the present invention is to provide a calling party invoked held call monitoring feature wherein the calling party has control over the activation of the held line monitoring feature when placed on hold by the called party.

Another object of the present invention is to provide a method of activating the monitoring of a call path established between a calling party and a called party, when said called party has placed said calling party on hold, wherein the calling party is able to activate, using a simple feature code, the held line monitoring feature.

Another object of the present invention is to provide a method of invoking a call path monitoring feature, wherein a message is used to provide instructions to the called party on how to reach the calling party once the hold is removed.

Yet another object of the present invention is to provide a method of invoking a held call monitoring feature, wherein the held party is informed of the hold release by detecting a signal indicative that the hold has been removed.

Yet another object of the present invention is to provide a method of invoking a held call monitoring feature, wherein the held party is informed of the hold release by detecting a DTMF tone issued or generated by the called party.

Yet another object of the present invention is to provide a method of invoking a held call monitoring feature for a call established between a calling party and a called party via the public service telephone network (PSTN).

SUMMARY OF THE INVENTION

According to an aspect of the present invention, there is provided a method of invoking the monitoring of a communication link established between a first party and a second party, wherein the first party has placed the second party on hold, comprising the steps of:

(a) in response to said second party being placed on hold by said first party, generating a request at said second party to monitor said communication link for a signal indicative of the termination of said hold;

(b) responding to the receipt of said generated request to monitor said communication link for the termination of said hold, generating a message to said first party indicative that a held call monitoring feature has been activated and awaits said first party to generate said signal indicative of the termination of said hold; and (c) in response to said signal being generated by said first party, alerting said second party of the termination of said hold.

According to another aspect of the present invention, there is provided an apparatus for invoking the monitoring of a communication link established between a first party and a second party, wherein one party has placed the second party on hold, said apparatus comprising:

(a) means for generating a request at said second party to monitor said communication link for a signal indicative of the termination of said hold, in response to said second party being placed on hold by said first party;

(b) means for generating a message to said first party indicative that a held call monitoring feature has been activated and awaits said first party to generate said signal indicative of the termination of said hold in response to the receipt of said generated request to monitor said communication link for the termination of said hold; and (c) means for alerting said second party of the termination of said hold in response to said signal being generated by said first party.

In one embodiment, a service request is forwarded to a switching system to generate an audio message to the first party indicative that the held call monitoring feature has been activated. When the first party de-activates the hold, the audio message is played back to the first party.

In another embodiment, the service request is activated by said second party using an interactive screen-based telephone service, such as with the Analog Display Services Interface (ADSI) protocol.

In yet another embodiment, a subscriber terminal provides a user interface to enable said second party to activate a held line monitoring feature from the subscriber's terminal.

BRIEF DESCRIPTION OF THE DRAWINGS

The foregoing and other advantages of this invention will be apparent from the following detailed description of the embodiments described herein, when read in conjunction with the accompanying drawings in which.

DETAILED DESCRIPTION

Figure 1:
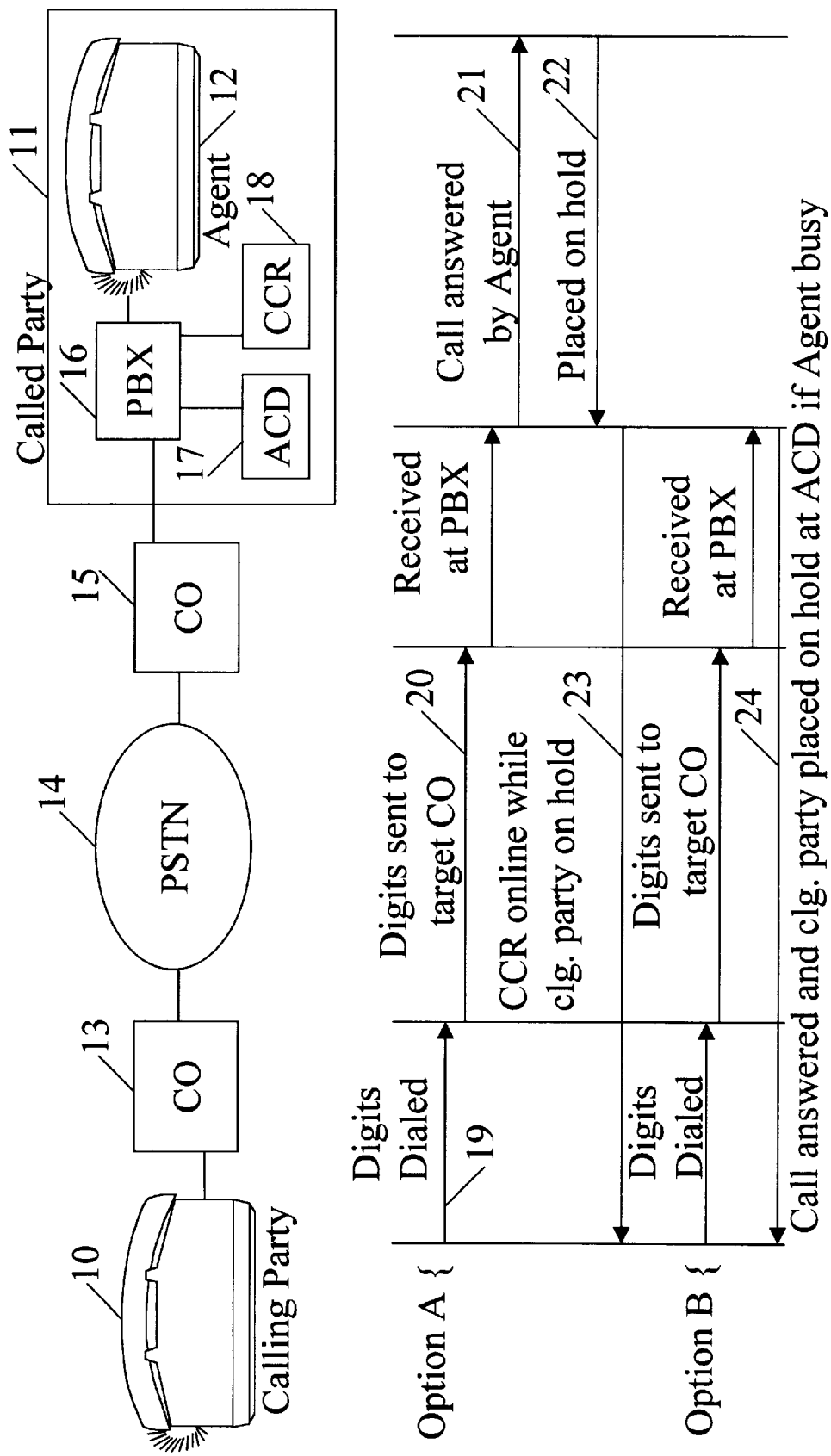
FIG. 1 is a block diagram illustrating how a typical call is placed on hold at the called party's end of the network.

Referring now to FIG. 1, we have shown a block diagram illustrating a typical call scenario wherein a calling party 10 is placed on hold by a called party 11. Called party 11 may take the form of a specific individual or a call center wherein one or more agents 12 is disposed to receive incoming calls. Calling party 10 places a call to the called party 11 via a serving central office 13, the PSTN 14 and target central office 15. For the purpose of this description, the serving central office is defined as the CO serving the calling party, whereas the target CO is defined as the CO used to reach the called party. The called party 11 may be connected to the target central office 15 via a PBX 16 or a key telephone system (KTS). Call centers handling numerous incoming calls will often make use of an automated call distribution (ACD) system 17 and/or a customer controlled router (CCR) 18. The ACD system 17 is used in situations wherein several calls are directed to a limited number of agents. Those calls that cannot reach a live attendant are placed on hold, in a queue, by the ACD system and provided with a predetermined message, music or the like. The CCR 18 is used in a similar fashion when, for example, the agent 12 answers the call and then wishes to place the calling party on hold. CCR 18 is activated to provide music on hold or an equivalent source of entertainment to the calling party 10.

It should be noted that generally the calling party is placed on hold by the called party, there are, however, also situations wherein the calling party places the called party on hold. For purposes of illustration in this description, it is assumed that the calling party is placed on hold by the called party, but the invention described functions identically regardless of which party initially placed the call.

In operation, when calling party 10 attempts to reach the called party 11, the called party's digits are dialed 19 and received at serving CO 13. Serving CO 13 will establish 20 a calling path towards the target CO 15 to enable the calling party to reach the called party. If an agent 12 of the called party answers the incoming call 21 and decides to place the calling party on hold 22, the CCR unit 18 is activated to provide the calling party with music on hold or other type of entertainment while the call remains on hold 23. If, however, the called party is unable to provide an agent to answer the call, ACD 17 would automatically answer the calling party's call and place it on hold 24 with a suitable message followed by music on hold or other type of entertainment for the calling party.

At this point, the calling party 10 can either wait on hold until the agent 12 becomes available, in the first scenario or until a first agent at the called party becomes available. If the calling party is not interested in holding, the calling party may hang up and try the call again at a later time.

As indicated previously, this can lead to frustration on the part of the calling party and can also lead to a reduction in customer satisfaction.

Figure 2:
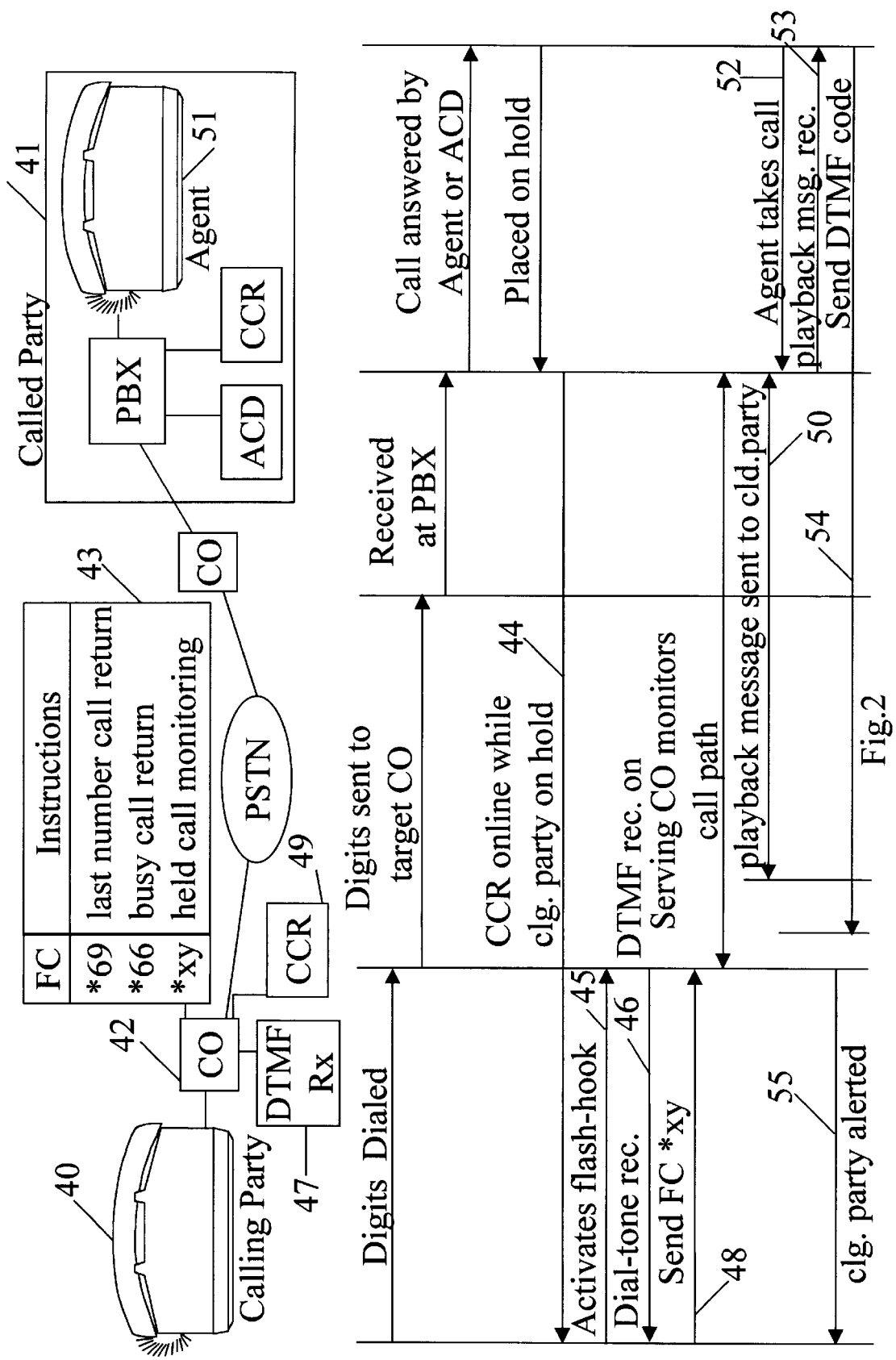
FIG. 2 is a block diagram illustrating a held call monitoring scenario according to a first embodiment of the present invention.

Referring now to FIG. 2, we have shown a block diagram illustrating a typical call scenario between a calling party 40 and a called party 41. The calling party 40 is being placed on hold as described in the call scenario of FIG. 1.

However, in the embodiment of FIG. 2, the calling party 40 can invoke a feature that enables central office 42 to monitor the path established between the central office 42 and the called party 41, when the calling party is placed on hold.

As will be described further below, the held call monitoring feature of the present invention is invoked by the held party, which can be either the calling party or the called party, but is always under the control of the party invoking the feature. This control can either take place at the subscriber terminal when using either a suitably equipped telephone set, an adjunct connected between the subscriber telephone set and the central office or provided at the central office as part of a service offering by the subscriber's telephone service provider. Similarly, as will be described further below, the feature could be invoked from a PBX or KTS based telephone system.

In the scenario illustrated in FIG. 2, the held line monitoring feature is provided at the central office by the subscriber's telephone service provider. In this regard, the held call monitoring feature can be designed to form part of a feature table 43 to enable easy activation of the held call monitoring feature by a calling party. Once activated, the serving CO 42 can monitor a call placed on hold by the far end. The feature code table 43 contains a number of standard service features offered by today's telephone service providers. For example, last number call return which is used by a subscriber to determine and/or return a missed call, can be activated by dialing *69. Similarly, if the number dialed is busy, activation of the *66 feature informs the subscriber when the called number goes back to an on-hook state. Similarly, the held call monitoring feature of the present invention can be invoked at the serving CO 43 by means of a similar feature code.

As in the embodiment of FIG. 1, the calling party 40 has been placed on hold 44 by the called party 41. To activate the held call monitoring feature, the calling party 40 activates a flash hook command 45 to obtain a dial tone 46 from the central office 42. At this point, a DTMF receiver 47 in the central office 42 is activated and monitors DTMF tones sent by the calling party to determine which feature the calling party wishes to activate. If an analog connection is used to the telephone set, DTMF tones would be used to activate the feature. On the other hand, if an ISDN line is used, other signalling methods could be used to communicate instructions to activate or deactivate the held line monitoring feature.

Similarly, an interactive screen-based telephone service, such as the Analog Display Subscriber Interface (ADSI) messaging protocol could be used instead of an audio playback message and instead of an using a DTMF tone to signal the end of the hold. An ADSI capable terminal would be able to display status information to both parties as well as instructions on activating the held line monitoring feature and/or instructions to the called party on how to alert the calling party when the hold is released. Thus, the service feature could appear on the ADSI display terminal and activated by the subscriber using a soft key. Once activated, the party that activated the hold could be informed of the held line monitoring feature using a scrolling text on the display with instructions on how to alert the held party once hold is removed. The signal to alert the held party that the hold has been removed could be triggered at the touch of a soft key, at the party that activated the hold. Once received at the held party, a distinctive ringing signal can be used to alert the subscriber. A terminal capable of displaying ADSI information is the VISTA 350 TRADEMARK available from Northern Telecom.

In the embodiment of FIG. 2, the calling party activates 48 the held call monitoring feature, identified as *xy in table 43. Once the DTMF receiver 47 receives the *xy DTMF tones, a sub-routine in the central office is enabled. This sub-routing activates CCR 49 to play 50 to the called party a message which indicates that the calling party has activated a monitoring feature and wishes to be alerted when the hold is removed. Once the feature code has been dialed by the calling party and the held monitoring has been activated by the central office, the calling party 40 can go on hook with the knowledge that he or she may be called back by the central office 42 to indicate that the hold has been removed.

Once an agent 51 at the called party 41 takes the call off hold or answers the call 52, the message sent from the serving central office 42 will be heard 53. The message may contain instructions to the called party on how to accept the call and reach calling party. In this embodiment, the called party is given the option of reaching the calling party by dialing a predetermined DTMF tone 54. The DTMF tone is then returned by the called party 41 to the serving central office 42. Once the predetermined tone is received at the serving central office 42, a determination is made of which directory number and line circuit is associated with the held call monitoring feature. The central office 42 then alerts the calling party 40 by generating a distinctive ringing tone if the subscriber is on hook or a distinctive call waiting tone if the subscriber is off hook 55.

Figure 3:
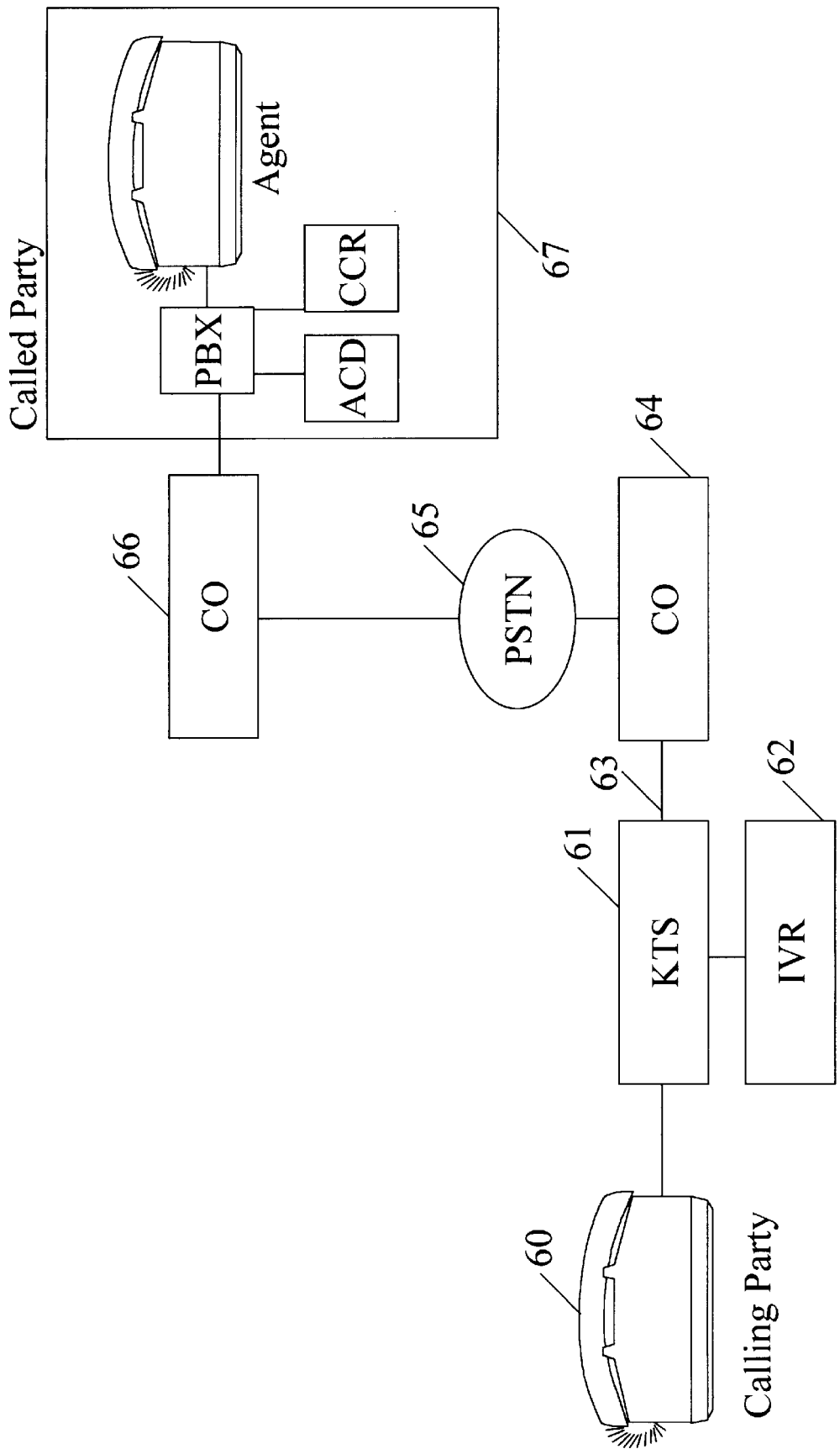
FIG. 3 is a block diagram illustrating a call scenario according to yet another embodiment of the present invention.

Referring to FIG. 3, we have shown a block diagram illustrating a network arrangement wherein the calling party 60 makes use of a key telephone system (KTS) 61 along with an interactive voice response (IVR) application module 62 to activate the held call monitoring feature of the present invention. The KTS 61 is connected by a standard telephone trunk 63 to a serving central office 64 for making a connection via the PSTN 65 to a target central office 66 on which is connected the called party 67. As indicated before, the called party may be a call center wherein a PBX or another key telephone system is used to service telephone users at that end. In this regard, the PBX or key telephone system may make use of an automated call attendant or a customer control router to deliver a message or music on hold when calling parties are placed on hold at the called party's end. the calling party 60 is placed on hold, the telephone user can make use of the held call monitoring feature provided by their key telephone system by activating a feature code to instruct the key telephone system or an attached IVR adjunct to monitor the line and allow the caller to attend to other functions. In operation, when the calling party 60 activates the feature code, the feature code is received via a system's signaling channel at the KTS 61. The feature code is verified to determine whether it is a valid code. If the key telephone system determines that the feature code is valid, a sub-routine is activated at the key telephone system or the attached adjunct to play a voice recording for the called party indicating that the call is being automatically monitored and instructions as to how to connect to the calling party. As in the embodiment of FIG. 2, a DTMF code is generated by the called party to indicate that the call has been taken off hold and the Key system or adjunct should alert the calling party. The instruction message is repeated until the IVR 62 receives the specified DTMF code, thereby terminating the message. The sub-routine then instructs (KTS) 62 to alert the calling party using the data channel.

Figure 4:
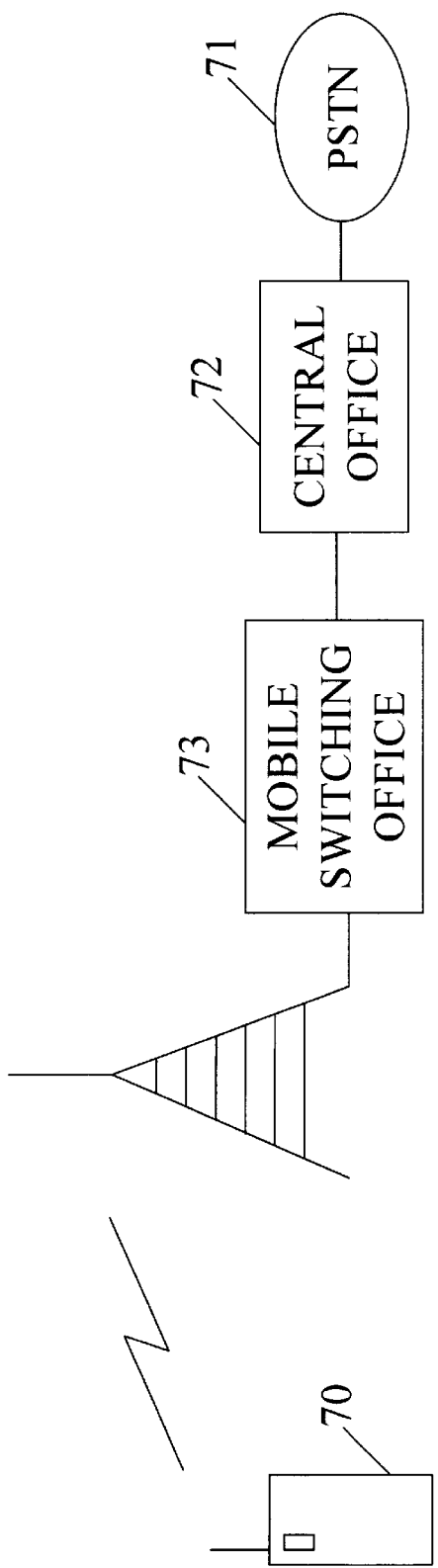
FIG. 4 is a block diagram illustrating a call scenario according to yet another embodiment of the present invention.

FIG. 4 illustrates an example of how the held line monitoring feature provided by the serving central office 72 or the mobile switching office 73 can be applied to a call from a wireless terminal 70 to the PSTN 71. The advantage of using this feature is that once activated, the wireless terminal subscriber is not charged air time waiting for the called party to release the hold. Once released by the called party, the central office 72 communicates with the mobile switching office 73 to alert the wireless terminal 70 that the hold has now been released. Air time for the wireless subscriber can resume once the call is answered.

Figure 5:
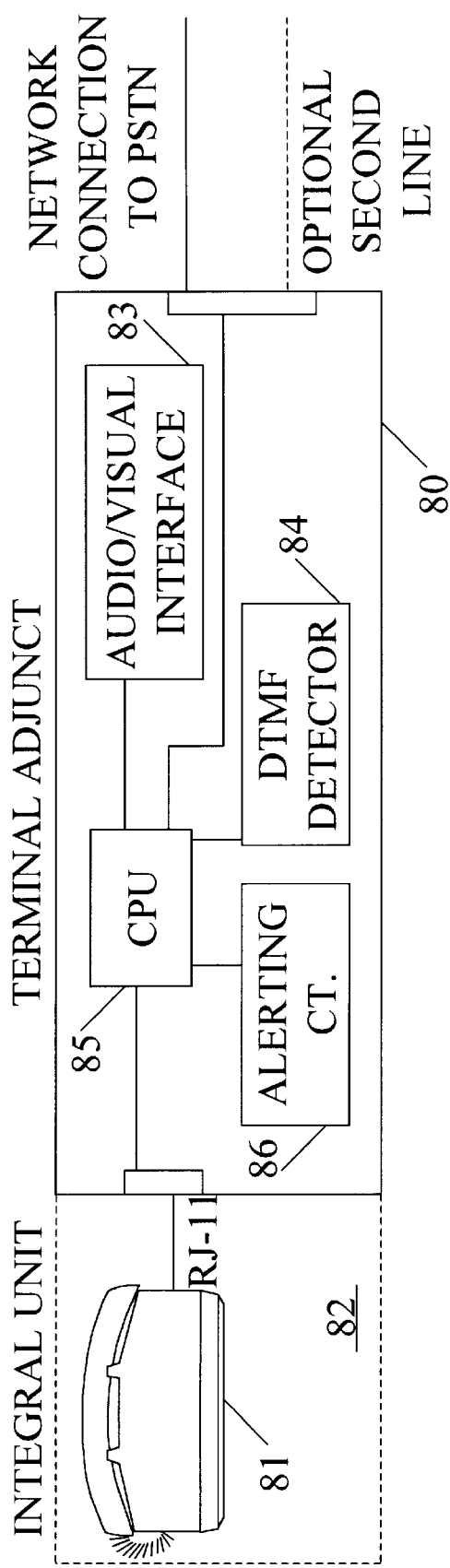
FIG. 5 is a diagram of a user interface for carrying out the feature of the present invention.

FIG. 5 illustrates an example of a terminal apparatus adapted to provide the held call monitoring at the subscriber premises. In one embodiment, the apparatus comprises a terminal adjunct 80 interfacing the subscriber's telephone set 81 with the telephone network. In another embodiment, the terminal adjunct functionalities and the telephone set 81 are integrated in a single unit 82. The terminal apparatus provides the held call monitoring feature by means of an audio and/or visual interface 83, a DTMF receiver or detector 84, controller 85 and an alerting circuit 86. The audio and/or visual interface 83 provides, once activated an audio and/or playback message to the called party. As indicated earlier, the playback message provides instructions to the called party on how the reach the calling party once the hold is removed. DTMF receiver or detector 84 is placed on standby to determine if the called party enters a DTMF tone to alert the calling party that the hold has been removed. The controller 85 is used to interpret the subscriber's commands for the activation or de-activation of the held call monitoring features. In addition, the controller enables the activation of an alerting circuit 86 to send an alerting signal or tone to the subscriber's telephone set upon receipt of a signal from the called party indicative of the release of the held call by the called party. It should be noted that if the subscriber terminal is not capable of receiving or sending ADSI messages, a second line may be required to provide the subscriber with the ability to complete a call on a second line while the first line is being monitored.

What is claimed is:

1. A method of invoking the monitoring of a communication link established between a first party and a second party terminal, wherein said first party has placed the second party terminal on hold, comprising:

generating a request at said second party terminal to monitor said communication link for a signal indicative of the termination of said hold, said generating being subsequent to said second party terminal being placed on hold by said first party terminal;

forwarding said request to an adjunct device located between said second party terminal and a public telephone network;

subsequent to the receipt of said generated request to monitor said communication link for the termination of said hold, generating a repeating message to repeatedly communicate said repeating message to said first party indicative that a held call monitoring feature has been activated and awaits said first party to generate said signal indicative of the termination of said hold; and, terminating said repeating message and alerting said second party of the termination of said hold, said terminating said repeating message and said alerting being responsive to said signal being generated by said first party.

2. A method as defined in claim 1, wherein said repeating message comprises a visual message which includes instructions to said first party terminal to generate a signal to said second party terminal indicative of the termination of said hold.

3. A method as defined in claim 2, wherein said adjunct device comprises a PBX.

4. A method as defined in claim 2, wherein said adjunct device comprises a key telephone system.

5. A method as claimed in claim 2, wherein said visual message comprises an Analog Display Subscriber Interface (ADSI) message.

6. A method as defined in claim 5, wherein said signal comprises an ADSI message.

7. A method as defined in claim 6, wherein in response to receiving said ADSI message at said adjunct device, generating an alerting signal at said adjunct device which is forwarded to said second party terminal.

8. A method as defined in claim 7, wherein said alerting signal comprises a distinctive ringing signal.

9. A method as defined in claim 5, wherein said signal comprises a DTMF tone.

10. A method as defined in claim 9, wherein in response to receiving said DTMF tone at said adjunct device, generating an alerting tone at said adjunct device which is forwarded to said second party terminal.

11. A method as defined in claim 10, wherein said alerting signal comprises a distinctive ringing signal.

12. A method as defined in claim 1, wherein said repeating message comprises an audio message.

13. A method as defined in claim 12, wherein said adjunct device, further comprises a message playback unit.

14. A method as defined in claim 13, wherein said signal comprises a DTMF tone, which when received at said adjunct device generates an alerting signal to said second party terminal.

15. A method as defined in claim 14, wherein said alerting signal comprises a distinctive ringing signal.

16. A method as defined in claim 1, wherein said adjunct device is colocated with said second party terminal.

17. A method as defined in claim 2, wherein said public telephone network comprises a mobile switching office and said second party terminal generates said service request from a wireless terminal.

18. An apparatus for invoking the monitoring of a communication link established between a first party and a second party, wherein said first party has placed the second party on hold, said apparatus comprising:

(a) means for generating a request at said second party to monitor said communication link for a signal indicative of the termination of said hold, in response to said second party being placed on hold by said first party; wherein said means for generating a request is an adjunct device disposed between a terminal being used by said second party and a public telephone network;

(b) means for generating a repeating message to repeatedly communicate said repeating message to said first party indicative that a held call monitoring feature has been activated and awaits said first party to generate said signal indicative of the termination of said hold in response to the receipt of said generated request to monitor said communication link for the termination of said hold; and (c) means for alerting said second party of the termination of said hold in response to said signal being generated by said first party.

19. A system for monitoring a communication link established over the public switched telephone network (PSTN) between a first party terminal and a second party terminal, wherein the first party terminal has placed the second party terminal on hold, said system comprising:

an adjunct device coupled between said second party terminal and said PSTN;

wherein said adjunct device includes:

a link monitor configured to monitor said link for an indication that said first party terminal has terminated said hold;

a recording device configured to store a message indicating that the second party terminal has initiated a held call monitoring feature and to repeatedly communicate said message to said first party terminal until said first party terminal terminates said hold; and, a signaling device configured to signal to said second party terminal that said first party terminal has terminated said hold.

20. A system according to claim 19, wherein said signaling device is configured to provide an audio signal.

21. A system according to claim 20, wherein said audio signal is a ring signal and said signaling device is configured to provide said ring signal to said second party terminal.

22. A system according to claim 21, wherein said ring signal includes a distinctive ring signal.

23. A system according to claim 19, wherein said signaling device is configured to provide a visual notification.

24. A system according to claim 22, wherein said signaling device is configured to provide said visual notification to said second party terminal.

* * * * *